(12) United States Patent
Grohmann et al.

(10) Patent No.: US 6,611,122 B2
(45) Date of Patent: Aug. 26, 2003

(54) METHOD OF CONTROL AND CONTROL STRUCTURE FOR THE MOVEMENT CONTROL, PRE-CONTROL AND FINE INTERPOLATION OF OBJECTS IN A SPEED CONTROLLER CLOCK WHICH IS FASTER THAN THE POSITION CONTROLLER CLOCK

(75) Inventors: Thomas Grohmann, Poxdorf (DE); Stefan Kuenzel, Erlangen (DE); Wolfgang Papiernik, Neunkirchen (DE); Bernd Quaschner, Grossenseebach (DE); Guido Seeger, Baiersdorf (DE); Johannes Welker, Neumarkt (DE)

(73) Assignee: Siemens Aktiengesellschaft, Munich (DE)

( * ) Notice: Subject to any disclaimer, the term of this patent is extended or adjusted under 35 U.S.C. 154(b) by 171 days.

(21) Appl. No.: 09/942,694

(22) Filed: Aug. 30, 2001

(65) Prior Publication Data

US 2002/0135335 A1 Sep. 26, 2002

(30) Foreign Application Priority Data

Feb. 2, 2001 (DE) .......................................... 101 04 712

(51) Int. Cl.$^7$ ........................... G05B 19/18; G05B 19/19
(52) U.S. Cl. ........................ 318/569; 318/560; 318/571; 318/572; 318/573; 318/574; 318/575; 318/594; 318/600
(58) Field of Search ............................... 318/560, 569, 318/571, 572, 573, 574, 575, 594, 600; 700/1–89

(56) References Cited

U.S. PATENT DOCUMENTS 4,368,511 A * 1/1983 Imazeki ...................... 364/167
4,543,639 A * 9/1985 Inabe et al. .................. 364/513
4,725,959 A * 2/1988 Nagata ........................ 364/474
4,740,885 A * 4/1988 Gose et al. .................. 364/149
4,906,908 A * 3/1990 Papiernik et al. ........... 318/600
6,291,959 B1 * 9/2001 Yoshida et al. .............. 318/569
6,341,244 B1 * 1/2002 Papiernik ..................... 700/170
6,353,301 B1 * 3/2002 Niwa ........................... 318/569
6,401,004 B1 * 6/2002 Yamazaki et al. ........... 700/159
6,401,006 B1 * 6/2002 Mizuno et al. .............. 700/189
6,456,897 B1 * 9/2002 Papiernik et al. ........... 700/194
6,487,944 B2 * 12/2002 Endo et al. .................. 82/1.11

FOREIGN PATENT DOCUMENTS

| DE | 0840441 A1 | * | 5/1998 | ........... H02P/21/00 |
| DE | 1229411 A2 | * | 8/2002 | ........... G05B/19/19 |
| EP | 0844542 B1 | | 11/1996 | |

* cited by examiner

Primary Examiner—Robert E. Nappi
Assistant Examiner—Tyrone Smith
(74) Attorney, Agent, or Firm—Baker Botts L.L.P.

(57) ABSTRACT

The invention makes it possible to execute the pre-control and the fine interpolation in the drive (A) in the fast drive clock (tDR) with a slower path pre-setting in the clock (tNC) of the NC. For this purpose, in each NC clock (tNC) a setpoint speed value (nNC*) and the P gain (kP) of the NC position controller (L_NC) and the desired axle speed (nNC) and the average axle speed (nNCMW) during the last NC position controller clock are transferred from the NC to the drive. From this information, polynomial segments of the third degree are in each case generated on the drive side, valid for the duration of an NC position controller clock (tNC). They are constructed in such a way that the speed at the polynomial transitions is constant. A variable component of the position polynomial is determined as the fine position component xF, with which the setpoint position values are finely interpolated in the drive. Furthermore, the speed (nVor) and the torque (iVor) can also be pre-controlled in a finely interpolated form in the drive, since the polynomial of the third degree can be differentiated twice.

19 Claims, 2 Drawing Sheets

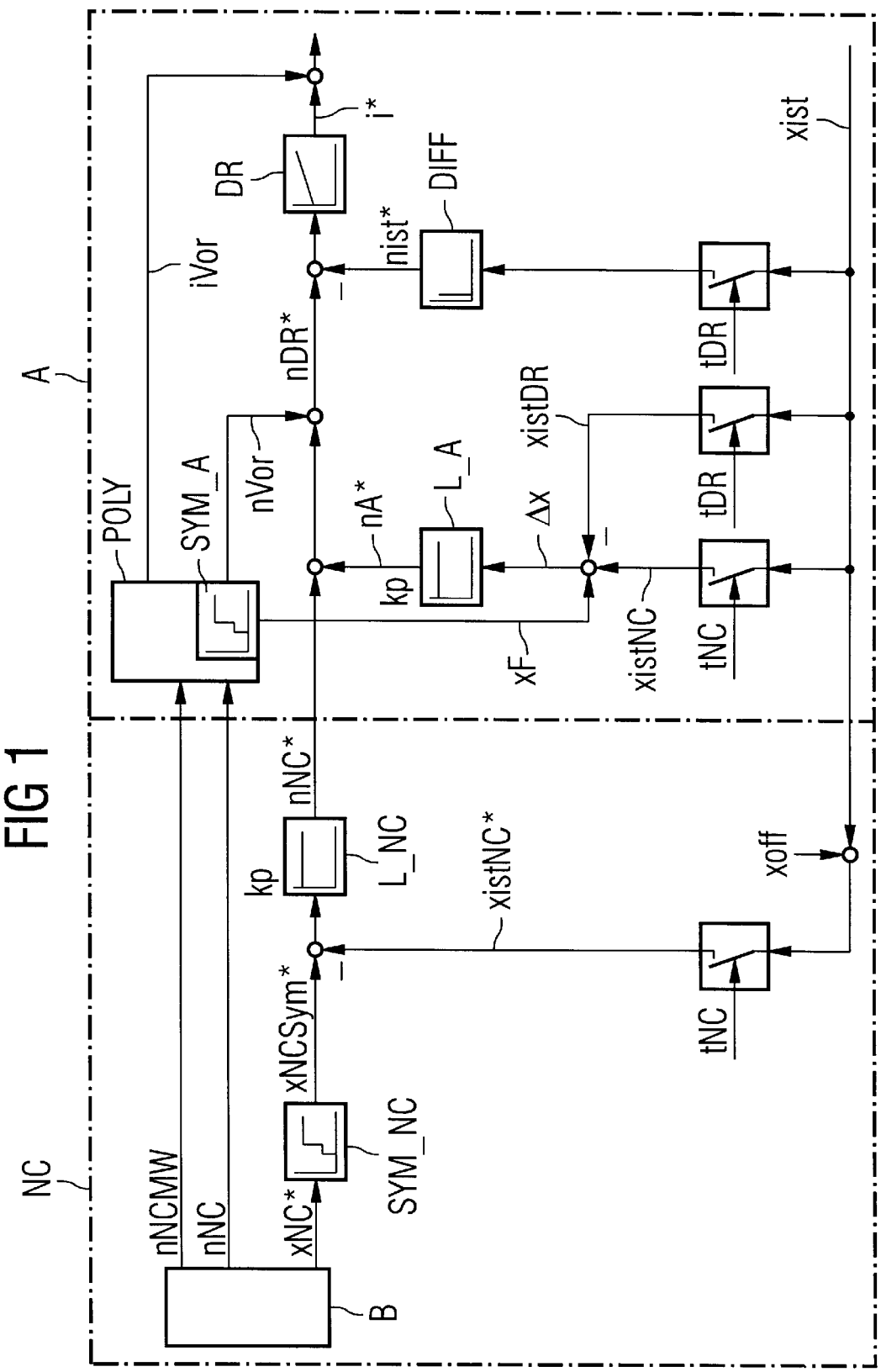

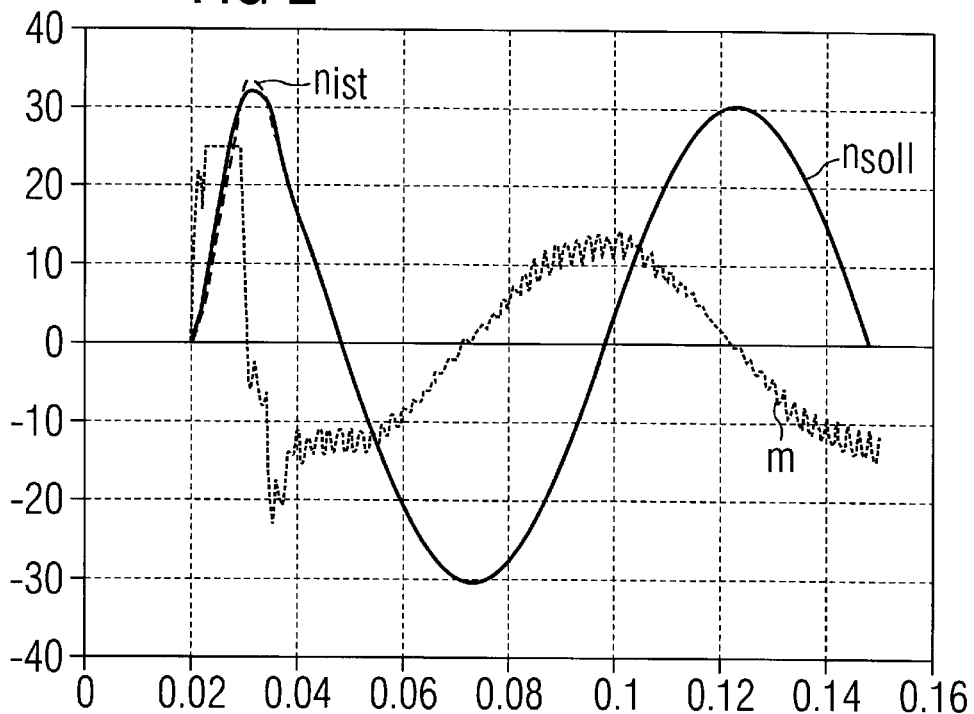
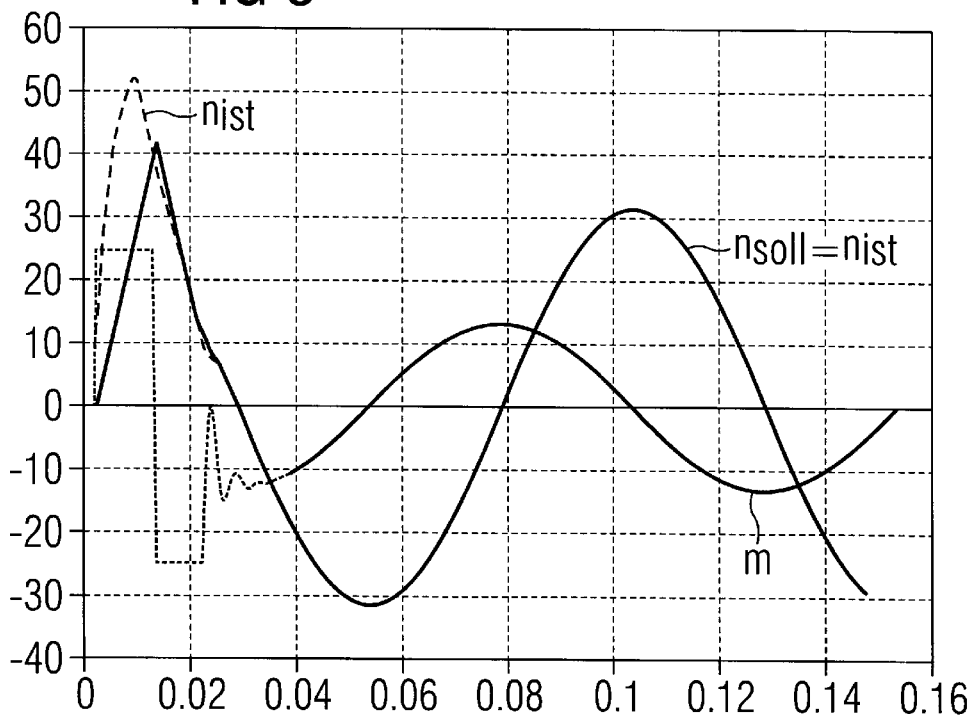

METHOD OF CONTROL AND CONTROL STRUCTURE FOR THE MOVEMENT CONTROL, PRE-CONTROL AND FINE INTERPOLATION OF OBJECTS IN A SPEED CONTROLLER CLOCK WHICH IS FASTER THAN THE POSITION CONTROLLER CLOCK

FIELD OF THE INVENTION

The present invention relates to a method of control and a corresponding control device for controlling the movement of numerically controlled machine tools, robots or the like ("machines") having a speed control system with a speed controller clock arranged in a drive part, and a higher-level position control system, distributed between a control part and the drive part. Setpoint speed values are preset as a reference variable by the control-side part of the position control system in a comparatively slower position control clock.

BACKGROUND OF THE INVENTION

For a complex movement control having a plurality of drives, a central numerical control system (abbreviated hereafter as NC) is often used for coordinating the movement control and outputting setpoint values to autonomously operating drive control systems. Since the computations for the coordinated movement control are generally complex and have to take place for a plurality of axes, the computing time burden of the NC is usually greater than the computing time burden of the individual drive control systems. Therefore, the sampling clock (period) of the drive control system is smaller, and the computing clock (frequency) is generally significantly greater than that of the NC.

Nevertheless, the position controllers for each axis are often computed in the NC in order to process all the information for the coordination of the axis movements together, this relieving the drive of numerous additional tasks such as referencing. If the position controllers are relocated into the drives, although NC computing time is saved and a more even computing time distribution is obtained, the NC no longer has the complete control which is necessary for a coordinated movement.

European Patent EP 0844542 B1 describes a method in which the position controllers are meaningfully distributed between the NC and the drives, the control dynamics of the position controller being determined by a comparatively fast sampling clock of the individual drive. However, this method only has a simple fine interpolator and all the pre-control values are still processed in the comparatively slow position controller clock of the NC. The linear fine interpolator leads for example to torque fluctuations in the position controller clock of the NC, which has adverse effects on the mechanics. Were the pre-control to be in the drive clock, it would bring with an enormous increase in the path-following accuracy.

Conventional approaches with an arrangement of the position controller in the NC lead to low position controller dynamics and path-following accuracy. An alternative arrangement of the position controller in the drive, on the other hand, leads to increased functional range in the drive and an increased need for communication between the drive and NC. Furthermore, the increased functional range in the drive generally has the effect that the sampling clock of the drive must be increased, which is undesirable with regard to the control dynamics. Furthermore, the path-following accuracy is notably inferior with pre-control in the position controller clock.

SUMMARY OF THE INVENTION

The object of the present invention is therefore to achieve an increase in the path-following accuracy for the method of control and/or control devices, by permitting fine interpolation and pre-control to occur in the drive clock. This object is achieved according to the present invention by the method of control stated wherein setpoint speed values preset by the control-side part of the position control system serve on the drive side for determining a constant component of a setpoint position value polynomial, the variable component of which is determined on the drive side in the speed control clock as a fine position component on the basis of a desired axle speed, preset by a control-side path computation in the position control clock in each case. The average axle speed during the last position control clock, and is fed on the input side to the drive-side part of the position control system and serves for fine position interpolation.

To obtain the advantages of the method described in EP 0 844 542 B1, actual position values acquired in the position control clock for determining the constant component of the setpoint position value polynomial are fed back as the first controlled variable on the input side to the control-side part of the position control system. The difference from actual position values acquired in the speed control clock and actual position values acquired in the position control clock is additionally fed back as the second controlled variable on the input side to the drive-side part of the position control system. The logical combination of the output values of the two higher-level position control parts is supplied to the speed control system as setpoint speed values.

The advantages which are realized are; the increased dynamics of a position control loop, without the computing effort required for this in the drive or on the part of the numerical control system being increased considerably; there continues to be a central awareness of all the states of the axes or groups of axes; the operations which are less important in terms of control technology continue to take place in the NC which is consequently not additionally burdened. Added to these is the fact that actual position values can be processed incrementally in a signal processor, whereby no other required floating-point numbers have to be processed. This brings with it a considerable gain in computing time.

In a preferred embodiment the drive-side part of the position control system is operated with the same proportional gain as the control-side part of the position control system. It is also preferred to determine the setpoint position value polynomial on the drive side from polynomial segments which are in each case valid for the duration of a position control clock, in particular as a spline function. Further, it is also preferred if the setpoint position value polynomial is determined on the drive side in such a way that the speed at the polynomial transitions is constant. With the fine position component of the setpoint position value polynomial, the setpoint position values in the drive then undergo fine interpolation in the speed controller clock.

If a polynomial of the third degree or higher is determined as the setpoint position value polynomial on the drive side, a speed pre-control can be achieved in the speed controller clock by differentiating the variable component of the setpoint position value polynomial for determining a speed pre-control value, which is fed on the input side to the speed control system. In this case it is recommended to adapt a control-side setpoint position value and the variable component of the setpoint position value polynomial dynamically by delaying them by a symmetrizing time.

If a polynomial of the third degree or higher is determined on the drive side as the setpoint position value polynomial, the variable component of which is differentiated twice, a torque pre-control in the drive clock can be additionally achieved by determining a torque pre-control value, on the basis of the value obtained and a moment of inertia of the drive, which is fed on the input side to a current control system arranged downstream of the speed control system. Here, too, a dynamic adaptation is recommended, namely, that the speed pre-control value be delayed by the symmetrizing time.

To allow the foregoing to be realized in a simple manner, a control device which is similarly suitable for achieving the object of the present invention is additionally provided, namely a control device for the movement control of numerically controlled machine tools, robots or the like having:
- a drive-side speed controller with a speed controller clock;
- a higher-level drive-side position controller with the speed controller clock; and
- a similar higher-level control-side position controller with a comparatively slower position controller clock, which supplies setpoint speed values as a reference variable; which further has a drive-side computing means preset with a desired axle speed and an average axle speed during the last position controller clock by a control-side path computation whereby the position controller clock determines a fine position component on the basis of this information in the speed controller clock and uses it to activate the drive-side position controller on the input side.

It has been found to be preferred if actual position values acquired in the position controller clock serve as an input-side controlled variable for the control-side part of the position control system. The difference from actual position values acquired in the speed controller clock and actual position values acquired in the position controller clock serves as an input-side controlled variable for the drive-side position controller, and the logical combination of the output values of the two higher-level position controllers is fed to the speed controller as setpoint speed values. In this case, it is recommended to operate the drive-side position controller with the same proportional gain as the control-side position controller.

In a further preferred advantageous configuration of the control device of the present invention, the computing means supplies the fine position component in the form of polynomial segments of a setpoint position value polynomial, in particular of the third degree or higher, which are, in each case, valid for the duration of a position controller clock. It has proven to be particularly preferred in this case if polynomial segments can be provided in such a way that the speed at the polynomial transitions is constant.

A pre-control of the speed in the speed controller clock is made possible by the computing means comprising a means for differentiation which can be used to differentiate polynomial segments for the determination of a speed pre-control value, which is fed to the speed controller on the input side. It has been found to be preferred if a dynamic adaptation takes place by a means for symmetrizing setpoint position values which is arranged upstream of the control-side position controller and the drive-side computing means comprises a further means for symmetrizing the fine position component.

If differentiation is performed twice with the means for the differentiation of polynomial segments it is possible, on the basis of the value obtained and a moment of inertia of the drive, to determine a torque pre-control value which can be fed on the input side to a current controller arranged downstream of the speed controller. A torque pre-control can be additionally achieved in the speed controller clock. Here, too, a dynamic adaptation is preferred, namely, that the drive-side means for symmetrizing also serves for the time delay of the speed pre-control value.

BRIEF DESCRIPTION OF THE DRAWINGS

Further advantages and details of the present invention will be apparent from the following description of a preferred embodiment and in conjunction with the figures, in which:

FIG. 1 shows a block diagram of a P position control system with feedback of the position differences and with element according to the invention for fine interpolation and pre-control in the speed controller clock;

FIG. 2 shows a result of simulation of a conventional P position control system with feedback of the position in the speed controller clock in the case of a sinusoidal setpoint position value; and FIG. 3 shows a result of simulation in the case of a similar sinusoidal setpoint position value, but with the fine interpolation and pre-control in the speed controller clock according to the invention.

DETAILED DESCRIPTION OF THE INVENTION

FIG. 1 is a block diagram of a P position control system (proportional position control), which is distributed between a numerical control system NC and a drive A. The control structure shown has the classic construction of a cascade control system with a current controller (not shown), a higher-level speed controller DR, which is arranged in the drive A and runs with a comparatively faster speed controller clock/drive clock tDR, and an even higher-level position controller L_NC, which runs with a comparatively slower position controller clock/control clock tNC of the position control system. Additionally, a drive-side position controller L_A is provided on the basis of the distributed position control system, which is likewise at a higher level than the speed controller and runs with the faster speed controller clock.

On the input side, setpoint position values xNC*, determined by a control-side path computation B, are preset as a reference variable, subjected to symmetrizing SYM_NC and are available as dynamically adapted setpoint position values xNCSym*. Actual position values xistNC* are fed back to this reference variable as a controlled variable, which are sampled in the position controller clock tNC, which is illustrated in the representation according to FIG. 1 in the form of a switch (sampling element) activated by tNC. The sampling element may also be fed a position offset value xoff on the input side. The difference between xNCSym* and xistNC* is fed to the control-side position controller L_NC and is passed on from there as a setpoint speed value nNC* via an interface between the NC and the drive to the speed control loop DR. The latter provides on the output side setpoint current values for the activation of the current controller (not shown). The equivalent time constant of the integrator in this case advantageously corresponds to the value of the position controller clock tNC. The speed control loop is closed on the drive side, in that the actual position values sampled in the speed controller clock tDR are differentiated in a differentiator DIFF and fed back as actual speed values nist* on the input side to the speed controller input.

Furthermore, the control structure shown in FIG. 1 has the drive-side position control system L_A known from EP 0844542 B1 with additional feedback of position differences in the speed controller clock tDR. It is evident from this that, apart from the actual position values xistNC* fed back in the feedback branch in the position controller clock tNC—as described above—a second feedback branch is provided to the input of the speed control loop DR, via which branch actual position values nA*, likewise determined by the drive-side position controller L_A, are fed back to the input of the speed control loop DR as a reference variable.

In the second feedback branch, the actual position values xist are sampled via a sampling element, which is activated in the speed controller clock tDR, whereby sampled actual position values xistDR are available in the speed controller clock. In addition, further actual position values xistNC sampled in the position controller clock are determined by means of a further sampling element which is activated via the position controller clock tNC and are subtracted from the actual position values xistDR acquired in the speed controller clock, so that position differences Δx are obtained and fed back via the drive-side position controller L_A for the second feedback branch as a controlled variable to the input of the speed control loop DR. These position differences Δx are consequently fed back additively to the actual position values xistNC* acquired on the control side in the position controller clock tNC.

This aforesaid control structure is then extended by the present invention by further elements, which bring about the above advantages in comparison with the known prior art. In particular, it becomes possible to execute the pre-control and the fine interpolation in the drive A in the fast drive clock tDR with a slower path pre-setting in the clock tNC of the NC. At the same time, as described above, in every NC clock tNC a setpoint speed value nNC* and the P gain kP of the NC position controller L_NC are transferred via a suitable interface from the NC to the drive A. Furthermore, still further variables provided in the control-side path computation B are transferred via this interface to the drive, specifically the desired axle speed nNC, and the average axle speed nNCMW during the last NC position controller clock (virtually a position difference).

From this information (nNC, nNCMW), the drive A generates in a computing means POLY (for example a suitably programmed signal processor or (application-specific integrated circuit) ASIC, polynomial segments of the third degree which are valid for the duration of an NC position controller clock tNC and constructed so that the speed at the polynomial transitions is constant. The constant element of the setpoint position value polynomial is determined in the drive (as in the case of patent EP 0844542 B1) from the NC setpoint speed value nNC*, the P gain kP of the NC position controller L_NC and the actual position value xistNC stored in the position controller clock tNC, in order to obtain the advantages of this procedure.

The remaining component of the position polynomial of the third degree without the constant element is referred to hereafter as "the fine position component xF." Consequently, the setpoint position values are finely interpolated in the drive A by the fine position component or fine interpolation component xF being fed on the input side to the position controller L_A. Furthermore, the speed and torque in the drive A can also be pre-controlled in a finely interpolated form, since the polynomial of the third degree can be differentiated twice. A corresponding differentiation can likewise take place in the computing means POLY.

For the speed pre-control, polynomial segments of the second degree are obtained, and for the torque, segments of the first degree are obtained. The speed pre-control values nVor obtained in this way are fed on the input side to the speed controller DR, this in conjunction with the two output values nNC* of the NC position controller L_NC and nA* of the drive-side position controller resulting in pre-controlled setpoint speed values nDR*. By analogy, torque pre-control values iVor determined in POLY are fed on the input side to the current controller (not shown). However, the torque pre-control is only possible if the moment of inertia J of the drive is known. If the moment of inertia J is not known, only the speed will be pre-controlled.

Possible computation specifications are described below for the computation of the setpoint position value polynomial of the third degree for the determination of the respective fine interpolation and pre-control values by the computing means POLY.

$$V_0(k)=nNC(k-1) \quad (1)$$

$$a_0(k)=-2\cdot(nNC(k)+2\cdot nNC(k-1)-3\cdot nNCMW(k)) \quad (2)$$

$$r_0(k)=6\cdot(nNC(k)+nNC(k-1)-2\cdot nNCMW(k)) \quad (3)$$

where k: is the discrete time in the position controller clock, $v_0(k)$: is the speed at the beginning of k $a_0(k)$: is the acceleration at the beginning of k; and $r_0(k)$: is the jolt at the beginning of k.

Consequently, the fine position component xF(k,t) (without symmetrizing) can be determined as follows:

$$xF(k,t) = v_0(k)\cdot\frac{t}{tNC} + \frac{1}{2}\cdot a_0(k)\cdot\left(\frac{t}{tNC}\right)^2 + \frac{1}{6}\cdot r_0(k)\cdot\left(\frac{t}{tNC}\right)^3 \quad (4)$$

For the value nVor(k,t) of the speed pre-control (without symmetrizing), this produces by differentiating once:

$$nVor(k,t) = v_0(k) + a_0(k)\cdot\frac{t}{tNC} + \frac{1}{2}\cdot r_0(k)\cdot\left(\frac{t}{tNC}\right)^2 \quad (5)$$

Renewed differentiation then leads to the value iVor(k,t) for a torque pre-control:

$$iVor(k,t) = J\cdot\left(a_0(k) + r_0(k)\cdot\frac{t}{tNC}\right) \quad (6)$$

The pre-control should also be additionally symmetrized (dynamically adapted) in order to avoid undesired controller movements up to the time when the pre-control becomes effective. The transfer values nNC and nNCMW are symmetrized in the drive, before the coefficients for the setpoint position value polynomial are determined from them in accordance with the above equations (1), (2) and (3). The symmetrizing time is preset to the drive A for this purpose by the NC. In the symmetrizing, the setpoint position value xNC* is dynamically adapted by the symmetrizing unit SYM_NC already mentioned above. The same takes place for the fine interpolation component xF and the speed pre-control value nVor, in that these are delayed by the symmetrizing time by a symmetrizing unit SYM_A preferably integrated in the computation unit POLY.

If no torque pre-control is possible (for example moment of inertia J of the drive A is not known), the speed pre-control value nVor is not delayed. The symmetrizing time is transferred from the NC to the drive A and the latter then realizes the delay for the fine interpolation component xF and the speed pre-control nVor. The constant element of the setpoint position value polynomial is symmetrized by the NC.

With these measures according to the present invention, previously unachieved path accuracies can be attained with smooth torque characteristics, i.e. extreme precision and best preservation of the mechanical components, without compromising the advantages according to the patent EP 0844542 B1. The interface between the NC and the drive is in this case advantageously chosen such that as few data as possible have to be exchanged. This is achieved, inter alia, by appreciating the improvement possibilities and devising the described control structure, which distributes the tasks for the NC and the drive A in such a way that extreme path accuracy is produced along with a favorable allocation of computing time and a slender communication interface.

FIG. 2 and FIG. 3 show results of simulation in the case of a sinusoidal setpoint position value. Represented in each of the two figures are the setpoint speed value nsoll, the actual speed value nist and the associated torque m (mathematical derivative of the speed). FIG. 2 in this case shows the characteristics achieved by the method disclosed in patent EP 0844 542 B1. The transient response visible at the beginning (up to 0.04 s) results from the starting conditions of the simulation and should be ignored. In the oscillating characteristic of the torque m, the position controller clock can be seen. Also evident is a difference, albeit small, between the setpoint and actual speeds, which is intended to be expressed by the designation nsoll-nist.

FIG. 3 was produced under the same conditions, but by the method according to the present invention with a speed and torque pre-control. The torque m no longer exhibits any drops and a difference between the setpoint and actual speeds can no longer be perceived (nsoll=nist). Here, too, the transient response at the beginning of the simulation must be ignored.

We claim:

1. A control method for the movement control of a numerically controlled machine having a speed control system, a drive part, a speed controller clock arranged in the drive part, and a higher-level position control system having a control-side part and the drive-side part with setpoint speed values preset as a reference variable by a control-side part of the position control system in a comparatively slower position control clock, comprising using said setpoint speed values serve on the drive side-part for determining a constant component of a setpoint position value polynomial, and determining a variable component on the drive-side in the speed controller clock as a fine position component on the basis of a desired axle speed preset by a control-side part computation in the position control clock and an average axle speed during a last position control clock which is fed on the input side to the drive-side part of the position control system and which serves for fine position interpolation.

2. The control method according to claim 1, wherein actual position values, acquired in the position control clock for determining the constant component of the setpoint position value polynomial, are fed back as a first controlled variable on the input side to the control-side part of the position control system and any difference from actual position values acquired in the speed control clock and actual position values acquired in the position control clock is additionally fed back as a second controlled variable on the input side to the drive-side part of the position control system, and wherein a logical combination of output values of the two higher-level position control parts are supplied to the speed control system as setpoint speed values.

3. The control method according to claim 1, wherein the drive-side part of the position control system and the control-side part of the position control system are operated with a similar proportional gain.

4. The control method according to claim 1, wherein the setpoint position value polynomial is determined as a spline function from polynomial segments which are valid throughout the position control clock's duration.

5. The control method according to claim 4, wherein the setpoint position value polynomial is determined on the drive side so that the speed at the polynomial transitions is constant.

6. The control method according to claim 1, wherein the setpoint position value polynomial on the drive side is a polynomial of at least a third degree, the variable component of which is differentiated for determining a speed pre-control value which is fed on the input side to the speed control system.

7. The control method according to claim 6, wherein a control-side setpoint position value and the variable component thereof dynamically adapted by delaying them by a symmetrizing time.

8. The control method according to claim 1, wherein a polynomial of at least the third degree is determined on the drive-side as the setpoint position value polynomial, the variable component of which is differentiated twice for determining a torque pre-control value, the torque pre-control value being determined on the basis of the value obtained and a moment of inertia of the drive and fed on the input side to a current control system arranged downstream of the speed control system.

9. The control method according to claim 6, wherein the speed pre-control value is delayed by a symmetrizing time.

10. The control method according to claim 8, wherein the torque pre-control value is delayed by a symmetrizing time.

11. A control device for the movement control of numerically controlled machines comprising a drive-side speed controller having a speed controller clock, a higher-level drive-side position controller having a speed controller clock, and a higher-level control-side position controller having a comparatively slower position controller clock which supplies setpoint speed values as a reference variable, wherein a drive-side computing means which is preset with a desired axle speed and an average axle speed during a last position controller clock by a control-side path computation in the position controller clock by which a fine position component can be determined on the basis of this information in the speed controller clock and which is used to activate the drive-side position controller's input side.

12. The control device according to claim 11, wherein actual position values acquired in the position controller clock serve as an input-side controlled variable for the control-side of the position control system, and any difference between actual position values acquired in the speed controller clock and actual position values acquired in the position controller clock serves as an input-side controlled variable for the drive-side position controller, and a logical combination of output values of the two higher-level position controllers is fed to the speed controller as setpoint speed values.

13. The control device according to claim 11, wherein the drive-side position controller and the control-side position controller operate with the same proportional gain.

14. The control device according to claim 11, wherein the computing means supplies the fine position component in the form of polynomial segments of a setpoint position value polynomial of at least a third degree, which are valid throughout the position controller clock's duration.

15. The control device according to claim 14, wherein polynomial segments are provided so that a speed at a polynomial transition is constant.

16. The control device according to claim 14, wherein the computing means comprises a means for differentiation which can be used to differentiate polynomial segments for determination of a speed pre-control value which is fed to the speed controller on the input side.

17. The control device according to claim 16, wherein a means for symmetrizing setpoint position values is arranged upstream of the control-side position controller and the drive-side computing means comprises a further means for symmetrizing a fine position component.

18. The control device according to claim 16, wherein differentiation can be performed twice for determining a torque pre-control value, and on the basis of which and a moment of inertia of the drive of is possible to determine the torque pre-control value which can be fed on the input side to a current controller arranged downstream of the speed controller.

19. The control device according to claim 17, wherein the drive-side means for symmetrizing also serves as a time delay of the speed pre-control value.

* * * * *